United States Patent
Jang et al.

(10) Patent No.: US 10,033,026 B2
(45) Date of Patent: Jul. 24, 2018

(54) RECHARGEABLE BATTERY HAVING AN EXTERNAL TERMINAL AND MODULE THEREOF

(71) Applicant: SAMSUNG SDI CO., LTD., Yongin-si, Gyeonggi-do (KR)

(72) Inventors: Myung-Jae Jang, Yongin-si (KR); Sang-Won Byun, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 243 days.

(21) Appl. No.: 14/843,875

(22) Filed: Sep. 2, 2015

(65) Prior Publication Data

US 2016/0248073 A1 Aug. 25, 2016

(30) Foreign Application Priority Data

Feb. 24, 2015 (KR) ........................ 10-2015-0026025

(51) Int. Cl.
*H01M 2/24* (2006.01)
*H01M 2/30* (2006.01)
*H01M 2/06* (2006.01)
*H01M 2/26* (2006.01)

(52) U.S. Cl.
CPC ............... *H01M 2/30* (2013.01); *H01M 2/06* (2013.01); *H01M 2/26* (2013.01)

(58) Field of Classification Search
CPC ........... H01M 2/30; H01M 2/06; H01M 2/202
USPC ......................................................... 429/158
See application file for complete search history.

(56) References Cited

U.S. PATENT DOCUMENTS

| 8,956,753 | B2 | 2/2015 | Byun et al. | |
|---|---|---|---|---|
| 2013/0108916 | A1 | 5/2013 | Song et al. | |
| 2014/0199562 | A1* | 7/2014 | Kim | H01M 2/06 429/7 |
| 2014/0272520 | A1* | 9/2014 | Kim | H01M 2/202 429/121 |

FOREIGN PATENT DOCUMENTS

| KR | 10-2011-0109843 A | 10/2011 |
|---|---|---|
| KR | 10-2013-0048567 A | 5/2013 |

* cited by examiner

*Primary Examiner* — Gary Harris
(74) *Attorney, Agent, or Firm* — Lewis Roca Rothgerber Christie LLP

(57) ABSTRACT

A rechargeable battery includes an electrode assembly having electrodes located on either side of a separator; a case housing the electrode assembly; a cap plate sealing the case; a lead tab that is connected to each of the electrodes; and a terminal that is connected to a respective lead tab and protrudes from the case through a terminal hole, wherein the terminal comprises a different material than the lead tab, and wherein an insulating portion is located between the terminal and the cap plate.

11 Claims, 5 Drawing Sheets

RECHARGEABLE BATTERY HAVING AN EXTERNAL TERMINAL AND MODULE THEREOF

CROSS-REFERENCE TO RELATED APPLICATION

This application claims priority to and the benefit of Korean Patent Application No. 10-2015-0026025 filed in the Korean Intellectual Property Office on Feb. 24, 2015, the entire contents of which are incorporated herein by reference.

BACKGROUND

1. Field

The present invention relates to a rechargeable battery and a rechargeable battery module including the rechargeable battery.

2. Description of the Related Art

A rechargeable battery can be repeatedly charged and discharged, unlike a primary battery. A rechargeable battery of a small capacity is used for a small portable electronic device like a mobile phone or a laptop computer and a camcorder, and a rechargeable battery of a large capacity is used as a power source for driving a motor of a hybrid vehicle and an electric vehicle.

A rechargeable battery may be used as a single battery cell, as in a small electronic device, or may be used in a module state in which a plurality of battery cells are electrically connected, as in use for driving a motor. A rechargeable battery module is formed by connecting electrode terminals of unit battery cells with a busbar.

The rechargeable battery has a negative electrode terminal that is connected to a negative electrode of the electrode assembly and a positive electrode terminal that is connected to a positive electrode thereof. For example, the negative electrode and the negative terminal may be made of copper, and the positive electrode and the positive terminal may be made of aluminum.

One side of each of the negative and positive lead tabs is connected to a negative electrode and a positive electrode, respectively, and the other side thereof is connected to negative and positive electrode terminals, respectively. For this purpose, negative and positive electrode lead tabs are made of copper and aluminum, respectively.

Therefore, when forming a rechargeable battery module, typically a busbar that connects negative and positive electrode terminals of a unit battery cell is formed with a copper portion and an aluminum portion corresponding to the negative electrode terminal and the positive electrode terminal, respectively. In other words, the busbar integrally has a copper portion and an aluminum portion, wherein the copper portion is laser welded to the negative terminal, and the aluminum portion is laser welded to the positive terminal.

In this case, it may be difficult to weld a negative terminal that is made of copper and a copper portion of a busbar with present commercial technology. In other words, a welding quality of connections of negative and positive terminals of an adjacent unit battery cell with a busbar may be deteriorated.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery having an integrally formed lead tab that is connected to an electrode and a terminal that is provided outside of a cap plate. Further, embodiments provide a rechargeable battery module having improved welding quality that connects a terminal of a unit battery cell with a busbar.

An exemplary embodiment of the present invention provides a rechargeable battery including: an electrode assembly that has electrodes formed at both sides of a separator; a case that houses the electrode assembly; a cap plate that closes and seals an opening of the case; a lead tab that is connected to the electrode; and a terminal that is connected to the lead tab to be installed by interposing an insulating portion in a terminal hole of the cap plate and that is made of different metals from that of the lead tab to be provided at the outside of the cap plate.

The electrode may include a negative electrode and a positive electrode, the lead tab may include a negative electrode tab that is connected to the negative electrode and a positive electrode tab that is connected to the positive electrode, and the terminal may include a negative terminal that is integrally connected to the negative electrode tab and a positive terminal that is integrally connected to the positive electrode tab.

In the negative electrode, a current collector may be made of copper, and the negative electrode tab and the negative terminal may be made of a clad metal of which copper and aluminum are bonded.

In the positive electrode, a current collector may be made of aluminum, and the positive electrode tab and the positive terminal may be integrally made of aluminum.

The insulating portion may have one side of the terminal inserted into a terminal hole of the cap plate, enclose one side of the terminal by insert injection molding, and be filled within the terminal hole.

The insulating portion may have a groove that partially supports the terminal and that is separated from a portion of the terminal.

The groove may form a penetration opening together with a surface of the facing terminal.

The terminal may further include a first vertical portion that is separated from an external surface of the cap plate by interposing the insulating portion and that is located at the inside of the terminal hole by bending.

The first vertical portion may be surface treated to be attached to the insulating portion.

The lead tab may include: a second vertical portion that is connected to the first vertical portion with a clad metal; a plane portion that is bent to the opposite side of the terminal in the second vertical portion to be disposed at the inside of the cap plate; and a current collecting portion that is bent to the opposite side of the cap plate at the side of the plane portion to be connected to an uncoated region of the electrode assembly.

The first vertical portion may be made of aluminum, and the second vertical portion may be made of copper to form a clad metal.

Another embodiment of the present invention provides a rechargeable battery module including: a plurality of unit battery cells that have a negative terminal and a positive terminal; and a busbar that connects a negative terminal and a positive terminal of adjacent unit battery cells, wherein the negative terminal and the positive terminal are made of the same metal.

The negative terminal and the positive terminal may be made of aluminum to be connected with the busbar.

The busbar may be made of aluminum to be laser welded to the negative terminal and the positive terminal.

According to an exemplary embodiment of the present invention, by integrally forming a lead tab and a terminal that are made of different metals, welding quality of a busbar that is connected to the terminals by welding can be improved. In other words, by forming the terminal and the busbar with the same metal, welding quality of a busbar of terminals can be improved.

When forming a negative electrode of an electrode assembly with copper and forming a positive electrode with aluminum, by forming a lead tab that is made of copper to be connected to the negative electrode and a terminal that is made of aluminum with a clad metal, the lead tab and the terminal can be integrally formed.

DETAILED DESCRIPTION

Figure 1:
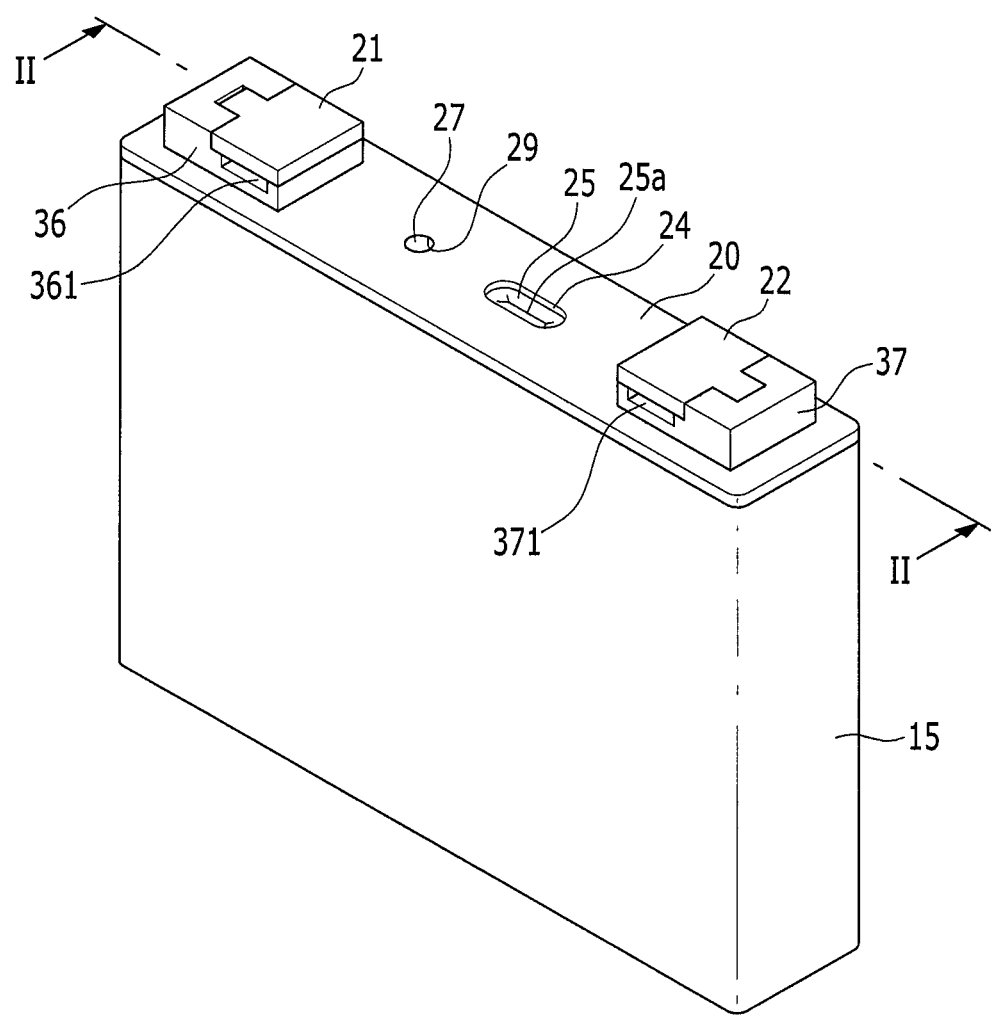
FIG. 1 is a perspective view illustrating a rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
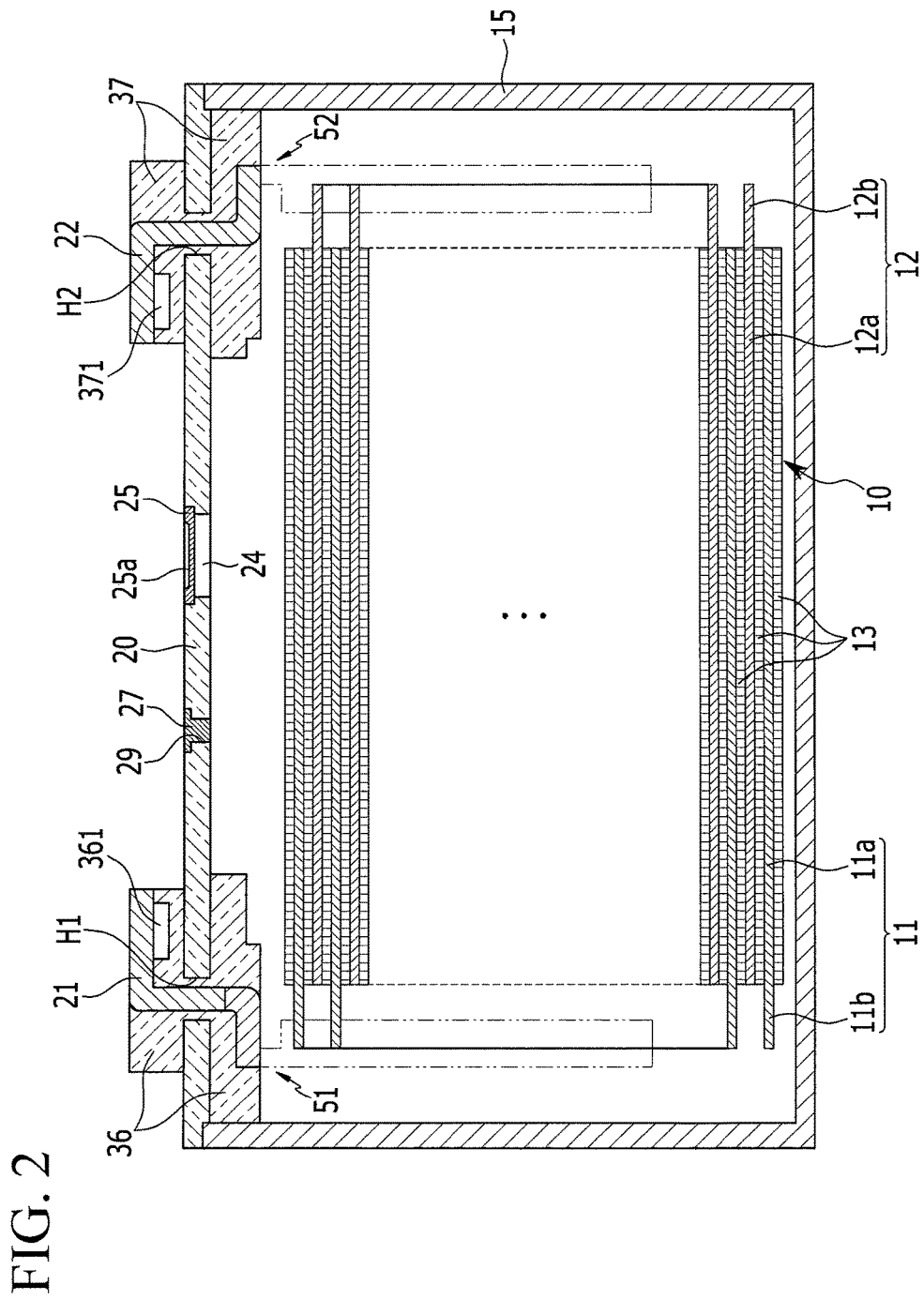
FIG. 2 is a cross-sectional view illustrating the rechargeable battery taken along line II-II of FIG. 1.

FIG. 1 is a perspective view illustrating a rechargeable battery according to an exemplary embodiment of the present invention, and FIG. 2 is a cross-sectional view illustrating the rechargeable battery taken along line II-II of FIG. 1. Referring to FIGS. 1 and 2, a rechargeable battery according to an exemplary embodiment includes an electrode assembly 10 that charges and discharges a current, a case 15 that houses the electrode assembly 10, a cap plate 20 that closes and seals an opening of the case 15, lead tabs 51 and 52 that are connected to the electrode assembly 10 (hereinafter, for convenience, referred to as "negative and positive electrode tabs"), and terminal 21 and 22 (hereinafter, for convenience, referred to as "negative and positive terminals") that are connected to the negative and positive electrode tabs 51 and 52 and that penetrate the cap plate 20.

For example, the electrode assembly 10 is formed by placing a negative electrode 11 and a positive electrode 12 at respective surfaces of a separator 13, which is an insulator, and by spirally-winding the negative electrode 11, the separator 13, and the positive electrode 12 in a jelly roll state.

The negative electrode 11 and the positive electrode 12 include coated regions 11a and 12a in which an active material is applied to a current collector of a metal foil, respectively, and uncoated regions 11b and 12b that are formed with an exposed current collector because an active material is not applied thereto, respectively.

The uncoated region 11b of the negative electrode 11 is formed in an end portion of one side of the negative electrode 11 along the spiral-wound negative electrode 11. The uncoated region 12b of the positive electrode 12 is formed in an end portion of one side of the positive electrode 12 along the spiral-wound positive electrode 12. The uncoated regions 11b and 12b are located at opposite ends of the electrode assembly 10.

For example, the case 15 may be formed as an approximate cuboid to provide a space that houses the electrode assembly 10 and an electrolyte solution therein and form an opening that connects the outside and an internal space at one surface of the cuboid. The opening enables the electrode assembly 10 to be inserted into the case 15.

The cap plate 20 is installed in an opening of the case 15 to close and seal the case 15. For example, the case 15 and the cap plate 20 may be made of the same material such as aluminum, to be securely welded to each other.

Further, the cap plate 20 has an electrolyte injection opening 29, a vent hole 24, and terminal holes H1 and H2. The electrolyte injection opening 29 enables injection of an electrolyte solution into the case 15. After the electrolyte solution is injected, the electrolyte injection opening 29 is sealed by a seal stopper 27.

In order to discharge an internal gas and an internal pressure of the rechargeable battery 100, the vent hole 24 is closed and sealed with a welded vent plate 25. When an internal pressure of the rechargeable battery 100 reaches a predetermined pressure, the vent plate 25 is fractured to open the vent hole 24. The vent plate 25 has a notch 25a that induces cutout.

The lead tabs 51 and 52 are connected to the electrode assembly 10, and the terminals 21 and 22 are connected to the lead tabs 51 and 52 to penetrate the terminal holes H1 and H2 of the cap plate 20 and are installed outside of the cap plate 20. In other words, the terminals 21 and 22 are electrically connected to the electrode assembly 10 through the lead tabs 51 and 52.

In more detail, the negative electrode tab 51 and the positive electrode tab 52 are electrically connected to the negative electrode 11 and the positive electrode 12, respectively, of the electrode assembly 10. The negative terminal 21 is integrally connected to the negative electrode tab 51, extends through the cap plate 20 at the terminal hole H1, wherein an insulating portion 36 electrically insulates the negative terminal from the cap plate. The negative terminal 21 and the negative electrode tab 51 are made of different metals.

The positive terminal 22 is integrally formed in the positive electrode tab 52, extends through the cap plate 20 at the terminal hole H2, wherein an insulating portion 37 electrically insulates the negative terminal from the cap plate. The positive terminal 22 and the positive electrode tab 52 are made of the same metal. In other words, the negative and positive terminals 21 and 22 are electrically connected to the electrode assembly 10 through the negative and positive electrode tabs 51 and 52, respectively.

For example, a current collector of the negative electrode 11 is made of copper, and a current collector of the positive electrode 12 is made of aluminum. In this case, the negative electrode tab 51 and the negative terminal 21 are made of copper and aluminum, respectively, to be made of a clad metal by which copper and aluminum are bonded. The positive electrode tab 52 and the positive terminal 22 are integrally made of aluminum.

In other words, the negative and positive electrode tabs 51 and 52 are made of the same material as a current collector of the negative and positive electrodes 11 and 12 to be welded to the negative and positive electrodes 11 and 12, and the negative and positive terminals 21 and 22 are made of the same material as a busbar 71 (see FIG. 5) to be laser welded. Therefore, while maintaining welding quality of the negative and positive electrode tabs 51 and 52 and the negative and positive electrodes 11 and 12, welding quality of the negative and positive terminals 21 and 22 and the busbar 71 can be improved.

The insulating portions 36 and 37 are formed by insert injection molding after having one side of the negative and positive terminals 21 and 22 inserted into the terminal holes H1 and H2 of the cap plate 20, respectively, thereby forming an insulating structure. In other words, the insulating portions 36 and 37 respectively enclose the negative and positive terminals 21 and 22 at the inner surface and outer surface side of the cap plate 20 and are formed within the terminal holes H1 and H2. For example, the insulating portions 36 and 37 may be made of a synthetic resin material.

Further, the insulating portions 36 and 37 electrically insulate the negative and positive terminals 21 and 22 and the cap plate 20 at an outer surface of the cap plate 20, and electrically insulate the negative and positive terminals 21 and 22 and the electrode assembly 10, and the negative and positive electrode tabs 51 and 52 and the electrode assembly 10, respectively, at an inner surface of the cap plate 20.

In this way, the insert injection molded insulating portions 36 and 37 simplify a structure that insulates the cap plate 20 and the electrode assembly 10 and a sealing structure of the terminal holes H1 and H2 while insulating between the negative and positive terminals 21 and 22 and the cap plate 20.

At an outer surface of the cap plate 20, the insulating portions 36 and 37 have grooves 361 and 371 facing the negative and positive terminals 21 and 22, respectively. The grooves 361 and 371 form a penetration opening in a thickness direction of a rechargeable battery together with a surface of the facing negative and positive terminals 21 and 22, respectively.

In other words, the insulating portions 36 and 37 partially support the negative and positive terminals 21 and 22 at parts thereof and are separated from a portion of the negative and positive terminals 21 and 22 by the grooves 361 and 371. Therefore, when welding the busbar 71 to the negative and positive terminals 21 and 22, the grooves 361 and 371 of the insulating portions 36 and 37 form a cooling air current and discharge welding heat, and thus prevent deformation and damage of the insulating portions 36 and 37 by laser and welding heat.

Figure 3:
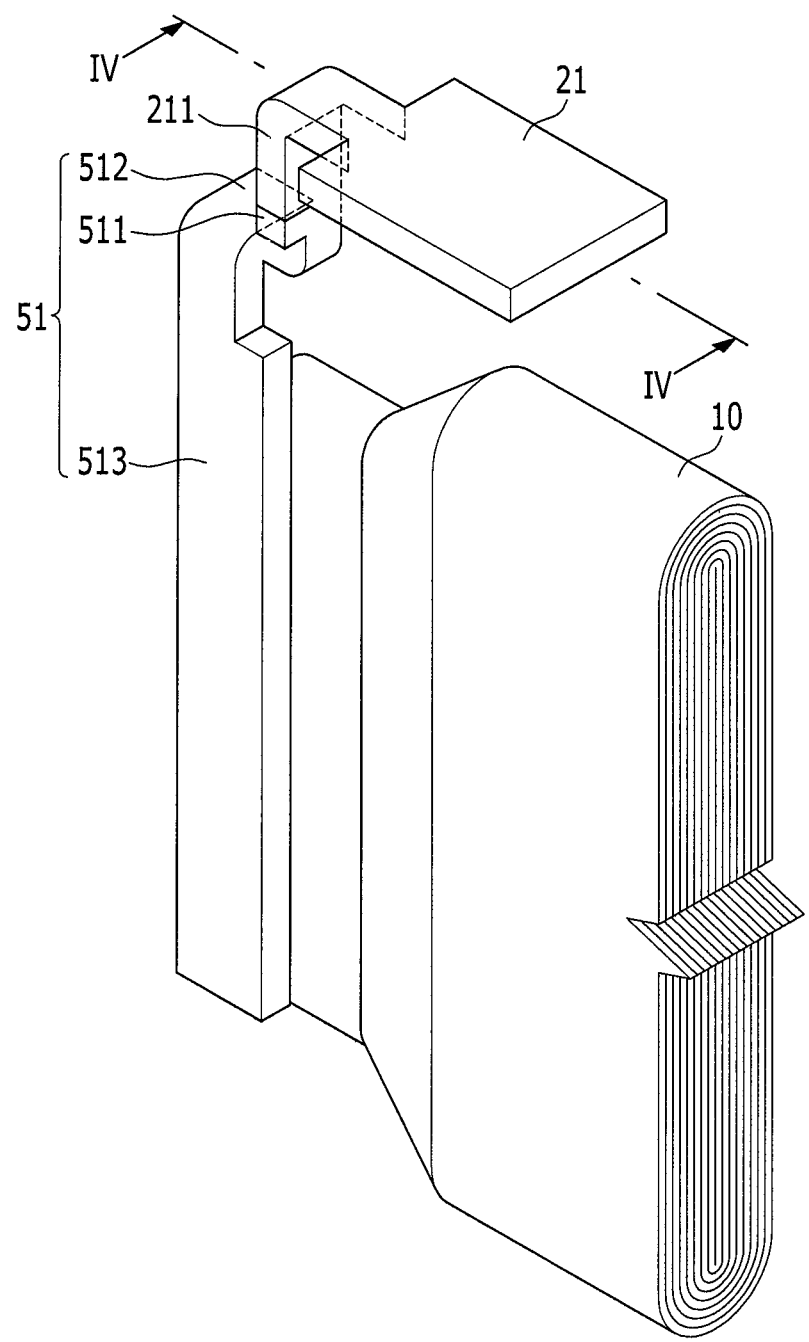
FIG. 3 is a perspective view illustrating a connection structure of an electrode assembly in a lead tab and a terminal that are integrally formed in the rechargeable battery of FIG. 2.
Figure 4:
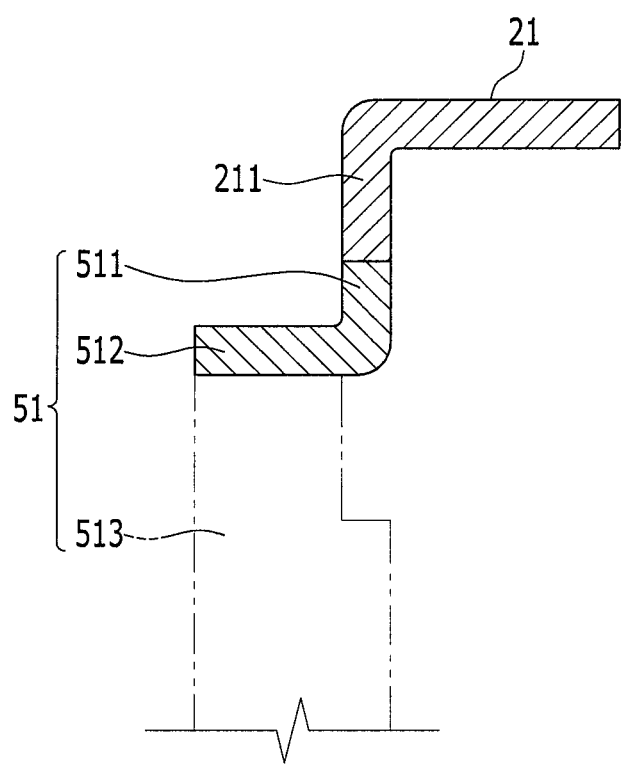
FIG. 4 is a cross-sectional view taken along line IV-IV of FIG. 3.

FIG. 3 is a perspective view illustrating a connection structure of an electrode assembly in a lead tab and a terminal that are integrally formed in the rechargeable battery of FIG. 2, and FIG. 4 is a cross-sectional view taken along line IV-IV of FIG. 3. For convenience, the negative terminal 21 and the negative electrode tab 51 that are connected to the negative electrode 11 are illustrated.

Referring to FIGS. 3 and 4, the negative terminal 21 further includes a first vertical portion 211 that is separated from an external surface of the cap plate 20 by the insulating portion 36 and that is bent to be located at the inside of the terminal hole H1.

When the negative terminal 21 is oriented with the insulating portion 36 at an outer surface of the cap plate 20, the first vertical portion 211 is coated and oriented with the insulating portion 36 within the terminal hole H1. In this case, the first vertical portion 211 is surface treated to be more securely attached to the insulating portion 36.

The negative electrode tab 51 includes a second vertical portion 511 that is connected to the first vertical portion 211 of the negative terminal 21 with a clad metal, a plane portion 512 that is connected to the second vertical portion 511, and a current collecting portion 513 that is connected to the plane portion 512.

The plane portion 512 is bent to the opposite side of the negative terminal 21 in the second vertical portion 511 to be located at the inside of the cap plate 20. Referring again to FIG. 2, an upper surface of the plane portion 512 is coated with an insulating material 36 and a lower surface thereof is exposed.

The current collecting portion 513 is bent to the opposite side of the cap plate 20 at the side of the plane portion 512 to be connected to the uncoated region 11b of the electrode assembly 10. The current collecting portion 513 is made of the same material as the uncoated region 11b, and is ultrasonic welded or resistance welded.

In more detail, the first vertical portion 211 of the negative terminal 21 is made of aluminum, and the second vertical portion 511 of the negative electrode tab 51 is made of copper to form a clad metal. The clad metal enables formation of the current collecting portion 513 with copper to maintain welding quality of the current collecting portion 513 and the uncoated region 11b, and enables simultaneous formation of the negative terminal 21 with aluminum, thereby improving welding quality of the negative terminal 21 and the busbar 71 (see FIG. 5).

Figure 5:
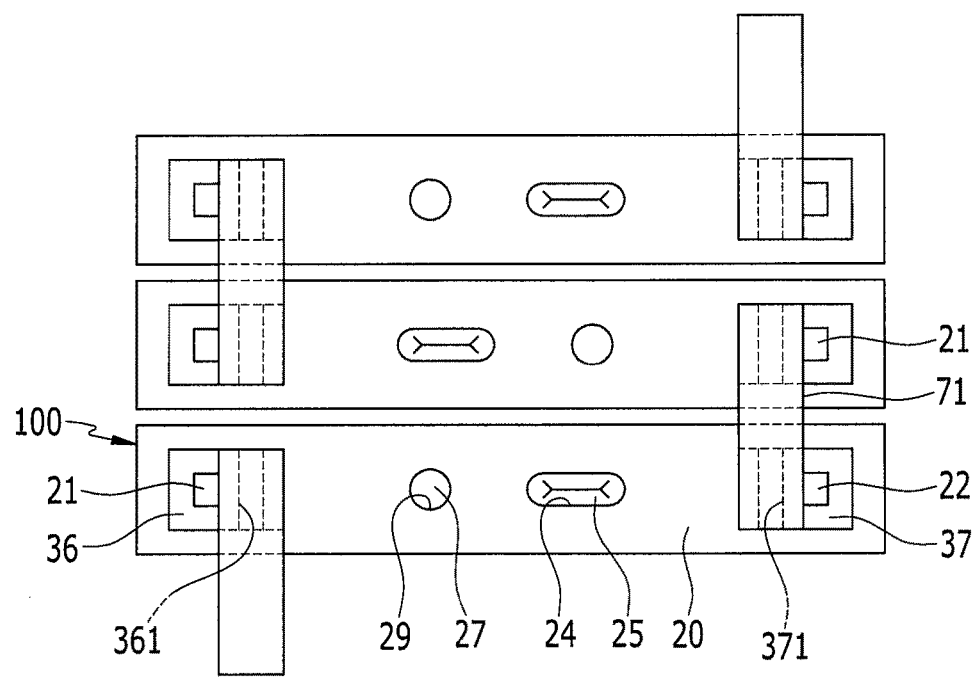
FIG. 5 is a top plan view illustrating a rechargeable battery module to which the rechargeable battery of FIG. 1 is applied.

FIG. 5 is a top plan view illustrating a rechargeable battery module to which the rechargeable battery of FIG. 1 is applied. Referring to FIG. 5, a rechargeable battery module of an exemplary embodiment includes unit battery cells 100 that are formed with rechargeable batteries and a busbar 71 that couples the adjacently disposed unit battery cells 100 in series. Alternatively, the unit battery cells may be coupled in parallel.

The negative terminal 21 and the positive terminal 22 are made of the same metal. For example, the negative terminal 21 and the positive terminal 22 are made of aluminum to be electrically connected by the busbar 71.

In one embodiment, the busbar 71 is made of aluminum that is the same material as the negative and positive terminals 21 and 22, and is laser welded to the negative terminal 21 and the positive terminal 22 of the adjacent unit battery cells 100. Therefore, welding quality of the busbar 71 to the negative terminal 21 and the positive terminal 22 can be improved.

When producing a rechargeable battery module, even when a failure occurs in welding of the busbar 71 to the negative and positive terminals 21 and 22, the same material of the negative and positive terminals 21 and 22 and the busbar 71 may enable replacement of only the busbar 71 in which a welding failure occurs and the unit battery cell 100 that is connected thereto.

In other words, welding quality of the busbar 71 can be improved, and even when welding quality of the busbar 71 is poor, waste of discarding an entire rechargeable battery module can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 10: electrode assembly | 11: first electrode (negative electrode) |
| 11a, 12a: coated region | 11b, 12b: uncoated region |
| 12: second electrode (positive electrode) | |
| 13: separator | |
| 15: case | 20: cap plate |
| 21, 22: negative and positive terminals | |
| 24: vent hole | |
| 25: vent plate | 25a: notch |
| 27: seal stopper | 29: electrolyte injection opening |
| 36, 37: insulating portion | 51, 52: negative, positive electrode tabs |
| 71: busbar | 100: unit battery cell |
| 211: first vertical portion | 361, 371: groove |
| 511: second vertical portion | 512: plane portion |
| 513: current collecting portion | H1, H2: terminal hole |

What is claimed is:

1. A rechargeable battery comprising: an electrode assembly comprising first and second electrodes, one of the electrodes being located on either side of a separator;
    a case housing the electrode assembly; a cap plate sealing the case;
    first and second lead tabs that are respectively connected to the first and second electrodes, each lead tab being made of a different metallic material; and
    irst and second terminals respectively coupled to the first and second lead tabs and protruding from the case through a respective terminal hole, each of the terminals having a substantially planar surface configured to accommodate a planar bus bar, wherein both terminals are made from the same material, wherein the first terminal comprises a different material than the first lead tab where the first terminal directly contacts the first lead tab, and wherein an insulating portion is located between the terminal and the cap plate.

2. The rechargeable battery of claim 1, wherein the first and second electrodes respectively comprise a negative electrode and a positive electrode, wherein the first and second lead tabs respectively comprise a negative electrode tab that is connected to the negative electrode and a positive electrode tab that is connected to the positive electrode, and wherein the negative terminal is integrally connected to the negative electrode tab and the positive terminal is integrally connected to the positive electrode tab.

3. The rechargeable battery of claim 2, wherein in the negative electrode, a current collector comprises copper, wherein the negative electrode tab comprises copper and wherein the negative terminal comprises aluminum.

4. The rechargeable battery of claim 2, wherein in the positive electrode, a current collector comprises aluminum, and wherein the positive electrode tab and the positive terminal are integral with each other and comprise aluminum.

5. The rechargeable battery of claim 1, wherein the insulating portion extends from within the case to outside of the case through the terminal hole of the cap plate and is insert injection molded.

6. The rechargeable battery of claim 5, wherein the insulating portion supports the terminal and has a groove that spaces part of the insulation portion from the terminal.

7. The rechargeable battery of claim 6, wherein the groove and a surface of the terminal define a penetration opening.

8. The rechargeable battery of claim 5, wherein each of the terminals further comprises a first vertical portion that is separated from an external surface of the cap plate by the insulating portion and that is located within the terminal hole.

9. The rechargeable battery of claim 8, wherein the vertical portion of each terminal is surface treated to be attached to the insulating portion.

10. The rechargeable battery of claim 8, wherein the first lead tab comprises: a vertical portion that is connected to the vertical portion of the first terminal as a clad metal; a plane portion that is bent with respect to the vertical portion and is located within the cap plate; and a current collecting portion that is bent with respect to the plane portion and is connected to an uncoated region of the electrode assembly.

11. The rechargeable battery of claim 10, wherein the first vertical portion of the first terminal comprises aluminum, and wherein the vertical portion of the first lead plate comprises copper to form a clad metal.

* * * * *